Patented July 20, 1926.

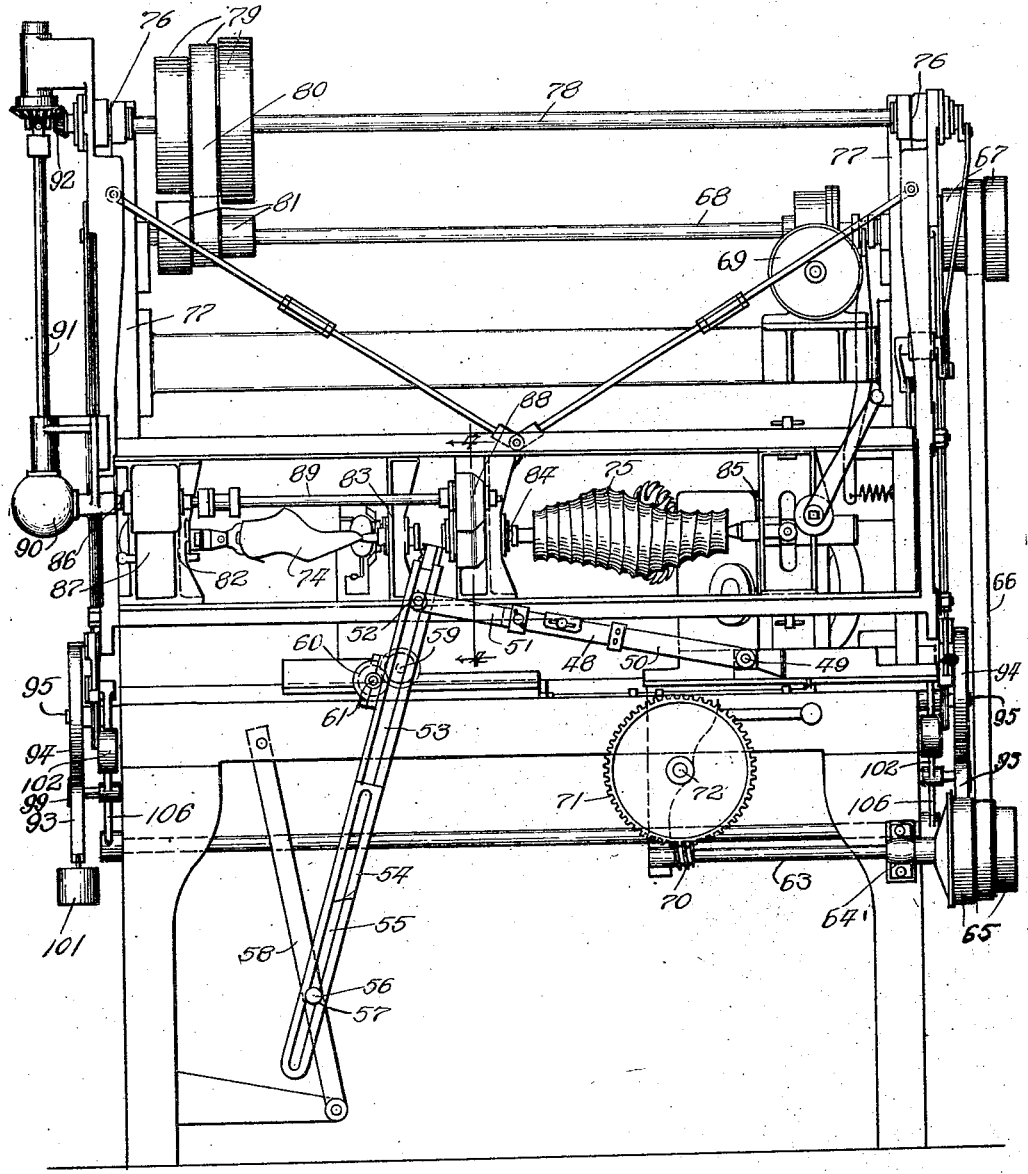

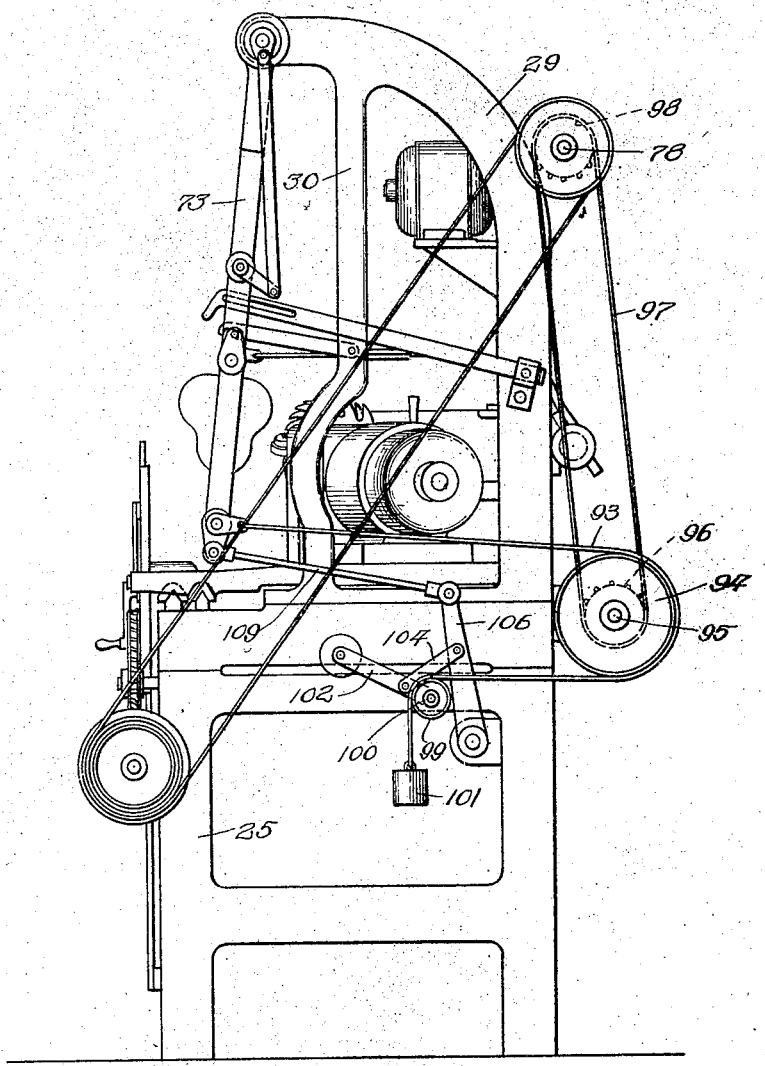

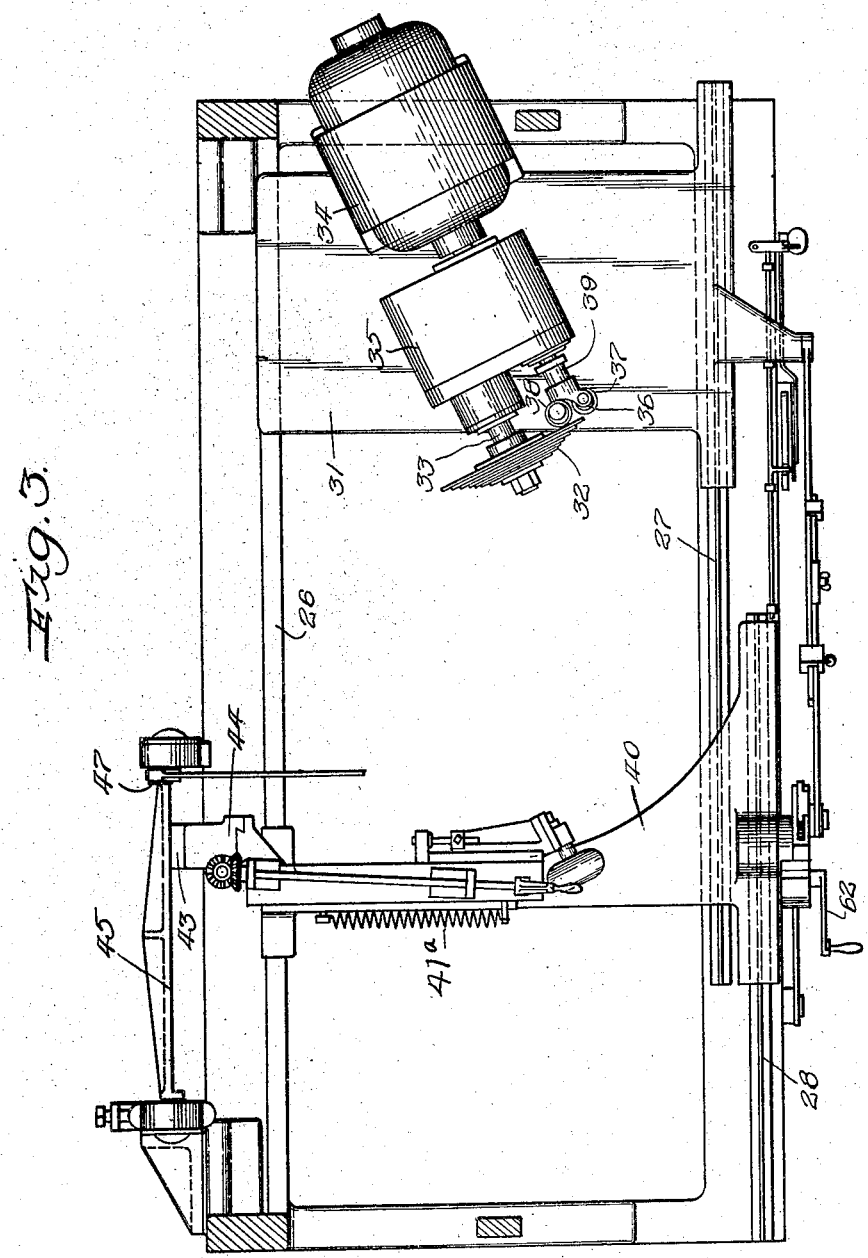

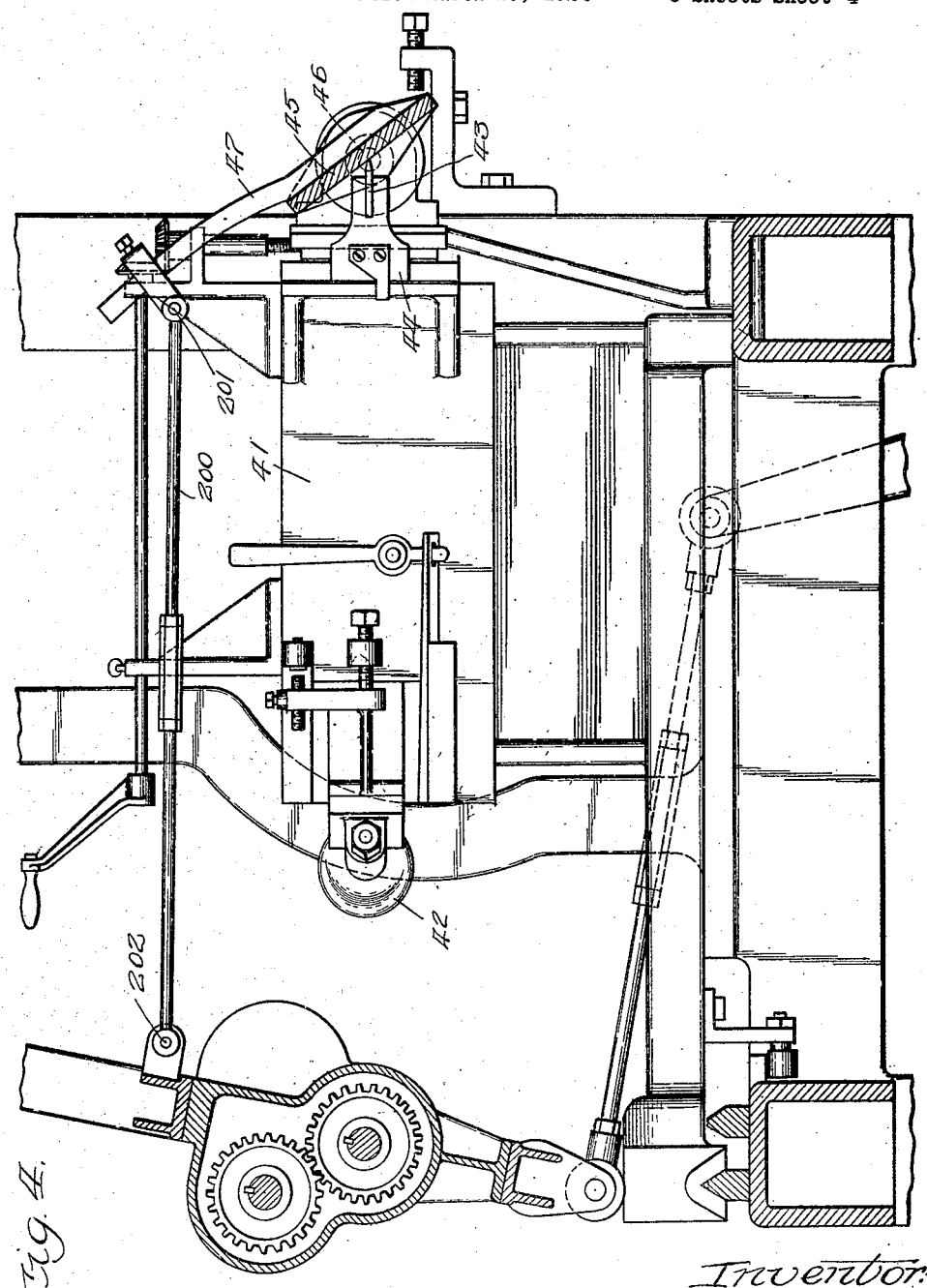

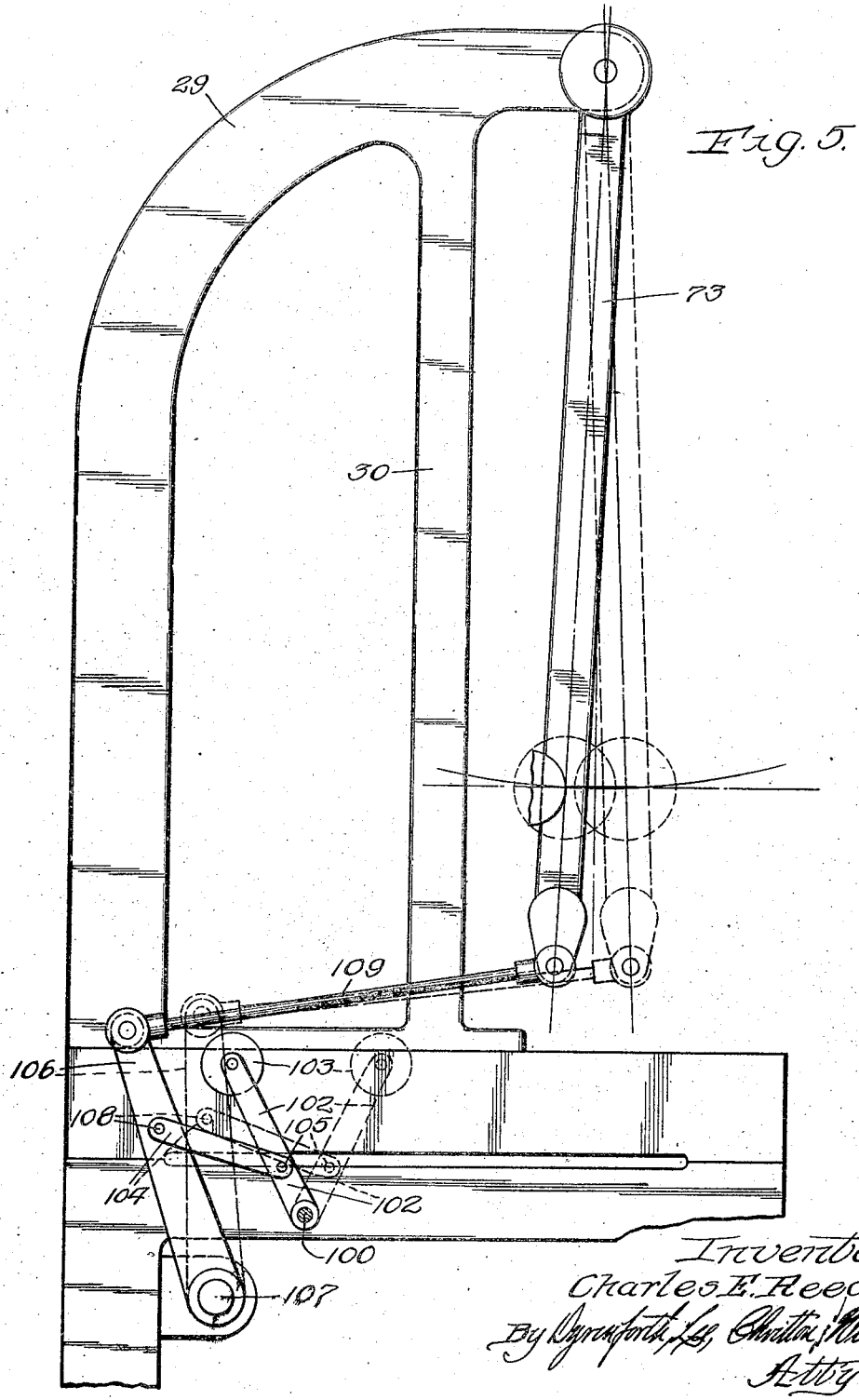

1,593,471

UNITED STATES PATENT OFFICE.

CHARLES E. REED, OF McHENRY TOWNSHIP, McHENRY COUNTY, ILLINOIS.

COPYING LATHE.

Application filed March 29, 1924. Serial No. 702,813.

My invention relates, more particularly, to lathes provided for the manufacture of shoe-lasts, and more especially graded shoe-lasts, and of the type comprising, as an element, a swing-frame which, in lathes of this type as commonly provided, has revolubly mounted thereon the pattern and the work, to cooperate with a pattern-follower and the cutter, respectively.

My present invention relates more especially to lathes of the type, and for the purpose, above stated, wherein the axis about which the swing-frame swings is so positioned relative to the follower and cutting mechanism that the swing-frame in its movements during the cutting operation swings to both sides of the vertical plane in which the axis of the swing-frame is located, such a particular construction of machine being disclosed in the application of Herman A. Schultz, for United States Letters Patent, filed March 29, 1924, Serial No. 702,812.

In explanation of the advantages of a machine having the characteristic above noted, it may be stated that in view of the fact that the portion of the swing-frame at which the pattern and work are located swings in an arc-shaped path, errors occur in the making of graded lasts or lasts of the same size as the pattern resulting in an imperfectly shaped last, this error, however, being so minimized in a machine wherein the swing-frame is so mounted that it swings to both sides of the vertical plane in which its axis is located, that it is negligible and the lasts produced are practically perfect. A further advantage of such a machine lies in the fact that the machine may be provided with a relatively short swing-frame, thus presenting a relatively short lever-arm, with consequent adaptability for practical operation at relatively rapid speed, without causing the lasts produced thereby to present any greater degree of error above referred to than is produced in machines now commonly in use and in which the axis of the swing-frame is so located that the swing-frame swings at one side only of the vertical plane in which its pivoting axis is located and the swing-frame presents a long lever-arm, and consequently requires to be operated at relatively slow speed.

A swing-frame so disposed, as stated, as to swing at both sides of the vertical plane in which the pivotal axis extends is subjected to the action of gravity, tending to swing it to vertical position, in all of its positions at either side of such vertical plane and thus uniform force mechanically applied to the frame swinging it toward the pattern follower results in the pressure exerted by the pattern against the follower greatly varying in the different positions of the swing-frame. It is in connection with the matter of the action of gravity tending to swing the frame to vertical position when the frame is at either side of such position, that I have devised my improvements the same embodiment of which as shown in this application is illustrated and described, but not claimed, in said application of Herman A. Schultz, it being my object to provide for the exertion of less non-uniform pressure of the pattern against the follower than is exerted where a substantially uniform force is mechanically exerted against the frame in its various swinging positions, and preferably to provide for the exertion of substantially uniform pressure of the pattern against the follower in all of the positions to which it swings.

While my application is applicable generally to machines of the type above referred to and in which the swing-frame swings to both sides of the vertical plane, I have devised it for embodiment more especially in a machine of the general construction shown in my pending application for United States Letters Patent, Serial No. 650,194, filed July 7, 1923, with its swing-frame positioned as shown and described in the above-mentioned application of Herman A. Schultz, and have therefore chosen to illustrate it in such a machine without, however, intending to be understood as desiring to limit the invention thereto.

Referring to the accompanying drawings:

Figure 1 is a view in front elevation of a machine of the general construction disclosed in my above-referred-to pending application, with the swing-frame positioned as shown in the said application of Herman A. Schultz, and showing the machine as equipped with my present improvements. Figure 2 is an end view thereof, viewing the machine from the right hand end in Fig. 1, and the swing-frame swung out forwardly to locked inoperating position. Figure 3 is a plan view of the machine with the upper works thereof shown in section and the swinging frame removed. Figure 4 is an enlarged section taken at the line 4—4 on Fig. 1 and viewed in the direction of the arrows, the machine being shown in the position illustrated in Fig. 2; and Figure 5, an enlarged broken view of the upper swing-frame-equipped portion of the machine, the machine being viewed from the left hand side of Fig. 1, with certain parts removed, this view showing the swing-frame and its counterweighting mechanism, by full lines in one of the positions they may occupy in the operation of the machine and by dotted lines, another position in which they may extend.

Referring to the particular illustrated machine, which is adapted for the turning of lasts of the pattern size, or graded, as desired, the same comprises a frame 25 provided adjacent its rear side with a guideway 26 and adjacent its front side with upwardly-extending parallel guide-ways 27 and 28 arranged in overlapping relation as shown in Figs. 2 and 3, the frame being provided at its opposite ends, above these guide means, with upwardly-extending standards 29 having forwardly curved extremities and brace-members 30. Mounted on the guide-ways 26 and 27 is a slide 31 which carries the cutting mechanism for cutting the work mounted in the swing-frame, as hereinafter described, this cutting mechanism, corresponding with the cutting mechanism of my said pending application, involving, generally stated, a roughing-cutter 32 formed of a plurality of toothed disks of successively larger diameters flatwise disposed on a shaft 33 driven from the shaft of a motor 34 secured on the slide 31, through the medium of gearing (not shown) located in a gear-housing 35, the cutting portion of the roughing-cutter 32 being of general frusto-conical form as shown. The cutting mechanism also comprises a finishing cutter represented at 36 formed of diametrically-opposed cup-shaped cutters 37 and 38 mounted on a shaft 39 and driven from the gearing in the housing 35.

Mounted on the guides 26 and 28 for movement in a direction lengthwise of the machine, is a slide 40 provided with guides, extending crosswise of the machine, on which a slide 41 is mounted to be movable longitudinally thereon, the slide 41 carrying the pattern-follower represented at 42. The slide 41 is provided with a rearwardly extending plate 43 (Fig. 4) mounted in a slide 44 vertically adjustable on the main body of the slide 41, the plate 43, opposing the front face of a plate 45 extending lengthwise of the machine and trunnioned at its opposite ends, as represented at 46, to the frame to rock crosswise of the machine on a horizontal axis, the plate 45 being provided with an upwardly-extending arm 47 operatively engaging with mechanism hereinafter described for causing the plate 45 to be rocked, responsive to the swinging movements of the swing-frame hereinafter described and comprising a link 200 having pivotal connection at its rear end with the lever 47 as represented at 201, and similar connection at its forward end with the swing-frame referred to, as indicated at 202. The slide 41 is caused to bear, at its plate 43, at all times, against the front face of the plate 45, through the medium of a spring 41ᵃ which is attached at one end to the slide 41 and at its opposite end to the slide 40.

The slides 31 and 40 are operatively connected together through mechanism for causing them to move simultaneously in the same direction lengthwise of the machine, either at the same speed, to produce a last of the exact size of the pattern hereinafter referred to, or at different speeds, to produce graded lasts, the said mechanism shown being the same as that illustrated in my said pending application, and comprising, generally stated, a bar 48 pivotally connected at one end to the slide 31, as indicated at 49, this bar being formed of lengthwise adjustable sections 50 and 51 to vary the effective length of the bar 48. The end of the bar 48 opposite that at which it connects with the slide 31 is pivotally connected, as indicated at 52, with the upper end of a rack bar 53 slidable up and down in a bar 54 slotted at its lower end, as indicated at 55, through which slot the pivoting stud 56 of a clamping device 57 carried by a stationary bar 58 and slidable up and down on the latter, extends, the bar 58 being rigidly connected, at its opposite ends, with the frame of the machine, as shown. The bar 53 is pivotally supported on the slide 40 through the medium of a pivot 59 and carries a rack (not shown) which meshes with a pinion (not shown) in a gear-case 60 carried by the bar 54, the pinion referred to being rigidly secured to a shaft 61 which is provided with a crank-handle 62 through the medium of which this pinion may be rotated to adjust the bar 53 lengthwise of the bar 54, it being understood that by varying the relatively movable members forming the connecting mechanism described, the slides 31 and 40 may be moved simultaneously at the same speed for the production of a last of the same length as the pattern, or different speeds, to produce longer or shorter lasts, as desired. The mechanism for moving the slides 31 and 40 lengthwise of the machine to feed the pattern-follower and the cutting mechanism along the pattern and work, respectively, mounted in the swing-frame referred to, comprises, in the particular construction shown, a shaft 63 journaled in a bearing 64 which has slight rocking movement in a vertical plane on the frame of the machine, one end of this shaft carrying pulleys 65, connected by a belt 66, with pulleys 67 secured to a shaft 68 forming the main driving shaft of the machine and driven from a motor represented at 69. The other end of the shaft 63 carries a worm 70 which meshes with a worm-wheel 71 secured to a shaft 72 journaled on the frame of the machine and meshing with a rack depending from the slide 31, the parts being so constructed and arranged that when the worm 70 meshes with the worm-wheel 71 the slide 31 will be driven from the shaft 63 to the left in Fig. 1, and through the medium of the lever mechanism hereinbefore described and connecting the slide 31 with the slide 40, the latter will be simultaneously moved in the same direction with the slide 31, at the same speed, or at a different speed therefrom, depending upon the setting of the said lever mechanism. The machine shown is provided with means for effecting the automatic arresting of the drive for the slides 31 and 40 at the conclusion of the operation of forming a last, but as the present invention has nothing to do with this feature of the machine, a detailed description thereof is omitted.

Referring now to the swing-frame of the machine and hereinbefore referred to, this frame is represented at 73, and forms a swinging support for the pattern 74 and the wood-blank 75, from which a last is to be formed, which are rotatably mounted therein, and in the operation of the machine are rapidly rotated, all as hereinafter described. The swing-frame 73 is journaled, in the particular construction shown, at its upper ends on the frame standards 29 at hollow trunnions 76 secured in the upper ends of the side arms 77 of the swing-frame 73. The trunnions 76 form journals for a shaft 78 extending therethrough and carrying the stepped pulleys 79 through the medium of which it is driven to rotate the pattern 74 and work 75, as hereinafter described, by the belt connection 80 with other belt pulleys 81 secured on the shaft 68. The pattern 74 is mounted on a head-stock 82 and a tail-stock 83, and the work 75 is mounted on a head-stock 84 and a tail-stock 85, to respectively oppose the pattern-follower and cutting mechanism hereinbefore referred to. The means shown, and which are the same as those of my hereinbefore-referred-to pending application, for rapidly rotating the pattern 74 and work 75, either in the same or opposite directions, as desired, comprise, generally stated, a shaft 86 journaled on the frame and geared to the spindles of the head-stocks 82 and 84 to cause the spindles to operate simultaneously, by gearing located in housings 87 and 88 on the frame 73, and a shaft 89 connected with the gearing referred to and journaled on this frame.

The shaft 86 is driven, through the medium of bevel gears (not shown) located in the housing 90, through the medium of a shaft 91 having bevel gear connection at 92 with the shaft 78.

The pivotal support for the swing-frame 73 is so disposed, as shown, that in the operation of turning a last the frame swings alternately from one side to the other of the vertical plane in which the axis about which the frame 73 swings, extends, the parts being preferably so proportioned and arranged that the frame 73 in the operations of turning a last such as those of the form now commonly manufactured, will swing, in its extreme movements, substantially the same distance, at opposite sides of the said vertical plane, the axis upon which the frame 73 swings being preferably so located that the alined axes about which the pattern and work rotate extend to the left of the vertical plane in which extends the axis about which the frame 73 swings, a distance of approximately one and a half inches, when these alining axes are coincident with the extreme forward point on the follower, as illustrated by the full lines in Fig. 5, assuming that the follower is lined up with the cutting mechanism. Such disposition of the parts very materially reduces the error above referred to, but to still further minimize such error the portions of the head and tail stocks in which the pattern and work are mounted are so disposed that their alined axes will extend a slight distance below the forwardmost point on the follower when the swing-frame is in vertical position. By way of example and assuming that the distance from the axes of the work and pattern to the pivotal support of the swing frame is the same as in machines as now commonly provided, the axes of the work and pattern would preferably extend below the plane in which the forwardmost point of the follower extends, about $\frac{1}{64}$ of an inch, when the swing frame is in vertical position.

In explanation of the advantages of so locating the axis about which the swing frame 73 extends that the swing-frame will swing to both sides of the vertical plane in which the pivotal axis extends, as above described, it may be stated that the ideal arrangement, from the standpoint of fully eliminating error in the lasts, would be to mount the pattern and the work on a member which would slide in a straight line toward and away from the follower and cutting mechanism. However, in practice, it is desirable to use a swing-frame for the pattern and the work, and thus the pattern and the work move through an arc-shaped path, and when the parts are disposed as above described, the distance through which the pattern and work move in a vertical path is very greatly reduced compared with the distance through which these parts move when the swing-frame, in the cutting operations, swings to one side only of the vertical plane in which extends the axis upon which the swing-frame swings. In designing a machine to embody the feature of the swing-frame swinging to both sides of such vertical plane, the designer, to properly locate the axis about which the swing-frame swings, relative to the pattern-follower, would first determine the length of the arc through which the pattern and work move in the movement of the frame from one to the other of its extreme positions in the cutting of lasts of the form commonly produced, and then locates the axis of the swing-frame so that when this frame is in the full line position shown in Fig. 5, in which position the alined axes of the pattern and the work are substantially coincident with the forward point on the follower, these alined axes will extend to the left of the vertical plane in which the pivotal axis of the swing-frame is located, a distance equal to substantially one-half of the length of the arc referred to.

It is necessary that the pattern 74 press against the pattern-follower 42 at all times, in the operation of the machine, whereby in the rotation of the pattern, the frame 73 is caused to oscillate by virtue of the rotation of the pattern against the follower, to the end that the blank, or work 75, will, in its rotation, be cut to present the same form as the pattern. The particular illustrated mechanism for this purpose comprises a belt 93 at each end of the machine, the forward end of each belt being connected with the lower portion of the frame 73 at each end thereof and extending over pulleys 94 fixed on the ends of a shaft 95 journaled on the frame of the machine and provided with a sprocket 96 connected by a sprocket chain 97 with a sprocket 98 secured to the shaft 78, the shaft 95 being thereby rotated in clockwise direction in Fig. 2. The belts 93 extend from the pulleys 94 to pulleys 99 rotatably mounted on shaft 100 and are provided at their free ends with weights 101.

The weighted belt devices described, by reason of the constantly rotating shaft 95, operate to exert against the swing-frame 73, at all times, and when counterbalanced as hereinafter described, a substantially uniform force in a direction to swing the frame 73 in counter-clockwise direction in Fig. 2 and serve to exert a snubbing action on the frame, preventing rebounding of the latter away from the pattern-follower and the cutting mechanism.

It will be noted, however, that the swing-frame 73, when it extends to the left of the vertical plane in which the pivotal axis of the swing-frame is located, as represented by full lines in Fig. 5, will tend to swing to the right in this figure and consequently away from the pattern-follower and cutting mechanism and when this frame swings to the right of said vertical plane, as shown by dotted lines in Fig. 5, it will tend to swing toward the pattern-follower and cutting mechanism. Therefore, in order that the swing-frame 73 be yieldingly forced toward the follower and cutting mechanism, with substantially uniform force, regardless of the position in which the frame depends, it is necessary to compensate for this condition, and to this end I have devised mechanism for this purpose, a description of the preferred form of which is as follows: Rigidly secured to the ends of the shaft 100 are upwardly-extending levers 102 each provided with a weight 103 at its upper end, these levers being similarly positioned on the shaft 100 and each connected, through the medium of a link 104 pivoted thereto at 105, with levers 106 rigidly secured to the ends of a shaft 107 journaled in the frame of the machine. The connections between the links 104 and the levers 106 are pivotal as represented at 108 and located between the ends of these levers, and the pivotal connections 105 are likewise located between the ends of the levers 102. The upper ends of the levers 106 are pivotally connected with rods 109, the forward ends of which are pivotally connected with the lower ends of the swing-frame 73 at the opposite ends of the latter, the shaft 107, levers 106 and rods 109 forming equalizers insuring against deflection of the swing-frame in the operations of the machine. It will be noted that in the particular construction shown the distance from the pivot points 105 to shaft 100 is much less than the distance from pivot points 108 to the shaft 107, whereby the leverage is compounded thus causing the levers 102 to swing through greater arcs than the swing-frame, and thereby, effectively counterbalancing the latter.

The lever-mechanism just described, and as shown, is so arranged that when the swing frame is in vertical position the levers 102 extend vertically upward and when this frame extends to the left in Fig. 5 as shown in full lines, these levers extend to the left as shown in full lines, and when the swing frame extends to the right of the vertical as shown by dotted lines, the levers 102 also extend to the right of this figure as shown by the dotted lines, the levers 102 thus serving to substantially counterbalance the force exerted by gravity against the swing frame and tending to swing the latter to vertical position. While the arrangement is such, as shown and described, that when the swing frame is vertical the levers 102 are vertical, it may be found desirable, under some conditions, to so modify this arrangement that the levers 102 will be slightly inclined in one direction or the other, when the swing frame is vertical and such arrangement, as well as other modifications of the mechanism shown, would be within the spirit of my invention.

It will be understood from the foregoing that in the preferred illustrated embodiment of my invention, the force exerted by the frame in the direction of the pattern-follower and cutting mechanism, is determined by the force exerted on the belts 93 which, in the preferred construction shown, depends on the speed at which the shaft 95 rotates and the weight of the bodies 101.

While I have illustrated and described a particular construction embodying my invention, I do not wish to be understood as intending to limit it thereto as the same may be modified and altered, without departing from the spirit of my invention; and as will be readily understood, the invention may be incorporated in a machine in which the swing-frame is pivotally supported below the axes of the work and pattern, as well as in a machine in which the pivotal support is above said axes.

What I claim as new, and desire to secure by Letters Patent, is:

1. In a last lathe structure, the combination of a pattern-follower and cutting mechanism, a swing-frame supporting a pattern and the work for cooperation with said follower and cutting mechanism, respectively and grading mechanism with which the swing frame and pattern follower are connected, the axis upon which said frame swings being so located that said frame in the cutting operation of the machine, swings to both sides of the vertical plane in which said axis is located, and means whereby said pattern and work are yieldingly held in all positions and at substantially the same pressure against said follower and cutting mechanism, respectively.

2. In a lathe structure, the combination of a pattern-follower and cutting mechanism, a support a swing-frame dependingly supported on said support and supporting a pattern and the work for cooperation with said follower and cutting mechanism, respectively, the axis upon which said frame swings being so located that said frame in the cutting operation of the machine, swings to both sides of the vertical plane in which said axis is located, means yieldingly forcing said frame in a direction toward said follower and cutting mechanism, and means substantially counteracting the tendency of gravity to swing said frame to vertical position from its operative positions at either side of said vertical plane.

3. In a lathe structure, the combination of a pattern-follower and cutting mechanism, a swing-frame supporting a pattern and the work for cooperation with said follower and cutting mechanism, respectively, the axis upon which said frame swings being so located that said frame in the cutting operation of the machine, swings to both sides of the vertical plane in which said axis is located, means yieldingly forcing said frame in a direction toward said follower and cutting mechanism, and counterweight means for said frame counterweighting said frame in the movements of the latter at both sides of said vertical plane.

4. In a lathe structure, the combination of a pattern-follower and cutting mechanism, a support, a swing-frame dependingly supported on said support and supporting a pattern and the work for cooperation with said follower and cutting mechanism, respectively, the axis upon which said frame swings being so located that said frame in the cutting operation of the machine, swings to both sides of the vertical plane in which said axis is located, means yieldingly forcing said frame with a substantially uniform pressure at all times in a direction toward said follower and cutting mechanism, and means substantially counteracting the tendency of gravity to swing said frame to vertical position from its operative positions at either side of said vertical plane.

5. In a lathe structure, the combination of a pattern-follower and cutting mechanism, a swing-frame supporting a pattern and the work for cooperation with said follower and cutting mechanism, respectively, the axis upon which said frame swings being so located that said frame in the cutting operation of the machine swings to both sides of the vertical plane in which said axis is located, means yieldingly forcing said frame in a direction toward said follower and cutting mechanism, a weighted, pivoted, lever and a connection between said frame and lever, said frame and lever being so proportioned and arranged that said lever moves to opposite sides of the vertical plane in which its pivot is located responsive to the movement of said frame.

6. In a lathe structure, the combination of a pattern-follower and cutting mechanism, a swing-frame supporting a pattern and the work for cooperation with said follower and cutting mechanism, respectively, the axis upon which said frame swings being so located that said frame in the cutting operation of the machine swings to both sides of the vertical plane in which said axis is located, means yieldingly forcing said frame in a direction toward said follower and cutting mechanism, a weighted, pivoted, lever and a connection between said frame and lever, said frame and lever being so proportioned and arranged that said lever moves to opposite sides of the vertical plane in which its pivot is located responsive to the movement of said frame and extends in said vertical plane when said frame extends in the vertical plane of the pivot of the latter.

7. In a lathe structure, the combination of a pattern-follower and cutting mechanism, a swing-frame supporting a pattern and the work for cooperation with said follower and cutting mechanism, respectively, the axis upon which said frame swings being so located that said frame in the cutting operation of the machine, swings to both sides of the vertical plane in which said axis is located, means yieldingly forcing said frame in a direction toward said follower and cutting mechanism, and compound-leverage means substantially counteracting the tendency of gravity to swing said frame to vertical position from its position at either side of said vertical plane.

8. In a lathe structure, the combination of a pattern-follower and cutting mechanism, a swing-frame supporting a pattern and the work for cooperation with said follower and cutting mechanism, respectively, the axis upon which said frame swings being so located that said frame in the cutting operation of the machine, swings to both sides of the vertical plane in which said axis is located, means yieldingly forcing said frame in a direction toward said follower and cutting mechanism, and compounded counterweight means for said frame counterweighting said frame in the movements of the latter at both sides of said vertical plane.

9. In a lathe structure, the combination of a pattern-follower and cutting mechanism, a swing-frame supporting a pattern and the work for cooperation with said follower and cutting mechanism, respectively, the axis upon which said frame swings being so located that said frame in the cutting operation of the machine, swings to both sides of the vertical plane in which said axis is located, means yieldingly forcing said frame with a substantially uniform pressure at all times in a direction toward said follower and cutting mechanism, and compound-leverage means substantially counteracting the tendency of gravity to swing said frame to vertical position from its position at either side of said vertical plane.

10. In a lathe structure, the combination of a pattern-follower and cutting mechanism, a swing-frame supporting a pattern and the work for cooperation with said follower and cutting mechanism, respectively, the axis upon which said frame swings being so located that said frame in the cutting operation of the machine swings to both sides of the vertical plane in which said axis is located, means yieldingly forcing said frame in a direction toward said follower and cutting mechanism, a weighted, pivoted, lever and a compound-leverage connection between said frame and lever, said frame and lever being so proportioned and arranged that said lever moves to opposite sides of the vertical plane in which its pivot is located responsive to the movement of said frame.

11. In a lathe structure, the combination of a pattern-follower and cutting mechanism, a swing-frame supporting a pattern and the work for cooperation with said follower and cutting mechanism, respectively, the axis upon which said frame swings being so located that said frame in the cutting operation of the machine swings to both sides of the vertical plane in which said axis is located, means yieldingly forcing said frame in a direction toward said follower and cutting mechanism, a weighted, pivoted, lever and a compound-leverage connection between said frame and lever, said frame and lever being so proportioned and arranged that said lever moves to opposite sides of the vertical plane in which its pivot is located responsive to the movement of said frame and extends in said vertical plane when said frame extends in the vertical plane of the pivot of the latter.

12. In a lathe structure, the combination of a pattern-follower and cutting mechanism, a swing-frame supporting a pattern and the work for cooperation with said follower and cutting mechanism, respectively, the axis upon which said frame swings being so located that said frame in the cutting operation of the machine swings to both sides of the vertical plane in which said axis is located, means yieldingly forcing said frame in a direction toward said follower and cutting mechanism, a weighted, pivoted, lever, a second pivoted lever, means whereby said second lever rocks responsive to movements of said swing-frame, and a link connecting said levers together and arranged to compound the movement of said first-named lever, the parts being so constructed and arranged that said first-named lever moves to opposite sides of the vertical plane in which its pivot is located responsive to the movement of said frame.

CHARLES E. REED.